US012207127B2

(12) United States Patent
Sanaullah et al.

(10) Patent No.: US 12,207,127 B2
(45) Date of Patent: Jan. 21, 2025

(54) SYSTEM AND METHOD FOR PRIORITIZATION OF NETWORK TRAFFIC ACROSS MULTIPLE WIRELESS OPTIONS

(71) Applicant: Dell Products, LP, Round Rock, TX (US)

(72) Inventors: Abu S. Sanaullah, Austin, TX (US); Liam B. Quinn, Austin, TX (US); Jace W. Files, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 41 days.

(21) Appl. No.: 17/705,816

(22) Filed: Mar. 28, 2022

(65) Prior Publication Data
US 2022/0225155 A1 Jul. 14, 2022

Related U.S. Application Data

(63) Continuation of application No. 16/779,493, filed on Jan. 31, 2020, now Pat. No. 11,290,910.

(51) Int. Cl.
*H04W 28/02* (2009.01)
*G06F 9/455* (2018.01)
(Continued)

(52) U.S. Cl.
CPC .... *H04W 28/0268* (2013.01); *G06F 9/45558* (2013.01); *H04B 17/318* (2015.01);
(Continued)

(58) Field of Classification Search
CPC ......... H04W 28/0268; H04W 28/0257; H04W 76/11; H04W 76/16; H04W 48/20;
(Continued)

(56) References Cited

U.S. PATENT DOCUMENTS

| 8,116,285 B1 * | 2/2012 | Barnum | ................ H04W 28/18 370/338 |
| 8,625,536 B2 * | 1/2014 | Ootani | .................. H04W 48/20 370/331 |

(Continued)

FOREIGN PATENT DOCUMENTS

| EP | 1502369 B1 | 4/2003 |
| EP | 3170272 B1 | 7/2015 |

(Continued)

*Primary Examiner* — Ajit Patel
*Assistant Examiner* — Wilfred Thomas
(74) *Attorney, Agent, or Firm* — Prol Intellectual Property Law, PLLC; H. Kenneth Prol

(57) ABSTRACT

An information handling system comprising a processor, memory, and a wireless network interface device and the processor executing an access point survey module to survey a plurality of access points distributed across the multi-channel communication network having a plurality of wireless protocol networks to, based on the type of wireless protocol network, determine and assign a numerical value to the access point characteristics based on access point related signal quality factors and data connection factors aggregate the numerical values associated with the factors for each access point and rank each access point based on an aggregated score and assign communication for a network slice from the wireless network interface to an access point channel based on the aggregated scores of the access point.

20 Claims, 5 Drawing Sheets

(51) Int. Cl.
  *H04B 17/318* (2015.01)
  *H04B 17/336* (2015.01)
  *H04L 5/00* (2006.01)
  *H04L 47/2425* (2022.01)
  *H04W 76/11* (2018.01)

(52) U.S. Cl.
  CPC ......... *H04B 17/336* (2015.01); *H04L 5/0051* (2013.01); *H04L 47/2433* (2013.01); *H04W 28/0257* (2013.01); *H04W 76/11* (2018.02); *G06F 2009/45595* (2013.01)

(58) Field of Classification Search
  CPC ....... G06F 9/45558; G06F 2009/45595; H04B 17/318; H04B 17/336; H04B 17/327; H04L 5/0051; H04L 47/2433
  See application file for complete search history.

(56) References Cited

U.S. PATENT DOCUMENTS

| | | | |
|---|---|---|---|
| 9,392,534 B2 | 7/2016 | Vrbaski | |
| 9,414,307 B2 | 8/2016 | Vrbaski | |
| 9,924,559 B2* | 3/2018 | Visuri | H04W 76/10 |
| 10,231,177 B2 | 3/2019 | Ringland | |
| 10,819,620 B2* | 10/2020 | Koshy | H04W 40/12 |
| 11,350,307 B2* | 5/2022 | Boyapalle | H04W 72/56 |
| 11,470,014 B2* | 10/2022 | Files | H04L 47/765 |
| 2005/0063328 A1* | 3/2005 | Dunagan | H04B 1/713 370/324 |
| 2005/0157676 A1* | 7/2005 | Kwak | H04W 28/14 370/328 |
| 2007/0234337 A1* | 10/2007 | Suzuki | G06F 8/61 717/168 |
| 2010/0151858 A1* | 6/2010 | Brisebois | H04W 8/22 455/434 |
| 2010/0246416 A1* | 9/2010 | Sinha | H04W 24/06 370/250 |
| 2012/0099428 A1 | 4/2012 | Kamdar | |
| 2013/0229931 A1 | 9/2013 | Kim | |
| 2013/0260804 A1* | 10/2013 | Ha | H04W 76/11 455/500 |
| 2015/0085686 A1 | 3/2015 | Chande | |
| 2017/0245316 A1 | 8/2017 | Salkintzis | |
| 2017/0272296 A1* | 9/2017 | Manolakos | H04W 76/28 |
| 2018/0034914 A1 | 2/2018 | Christopher | |
| 2018/0063851 A1 | 3/2018 | Abraham | |
| 2018/0124693 A1* | 5/2018 | Ringland | H04W 40/12 |
| 2018/0139095 A1* | 5/2018 | Wen | H04W 12/08 |
| 2018/0288702 A1 | 10/2018 | Kang | |
| 2019/0014436 A1 | 1/2019 | Radmand | |
| 2019/0124134 A1 | 4/2019 | Chmielewski | |
| 2019/0158340 A1 | 5/2019 | Zhang | |
| 2019/0238413 A1* | 8/2019 | Holmström | H04W 28/24 |
| 2020/0241866 A1* | 7/2020 | Gupta | H04L 67/34 |
| 2020/0267779 A1* | 8/2020 | Swami | H04W 48/20 |
| 2020/0275357 A1* | 8/2020 | Bordeleau | H04L 41/40 |
| 2020/0366611 A1 | 11/2020 | Kommula | |
| 2020/0408927 A1* | 12/2020 | Youssef | G01S 19/48 |
| 2021/0176685 A1* | 6/2021 | Changlani | H04W 36/38 |
| 2021/0314903 A1* | 10/2021 | Files | H04W 64/003 |
| 2021/0392576 A1* | 12/2021 | Ergen | H04L 9/3239 |

FOREIGN PATENT DOCUMENTS

| | | |
|---|---|---|
| EP | 3278598 B1 | 3/2016 |
| EP | 3278599 B1 | 7/2019 |
| WO | 2014/179713 A1 | 11/2014 |

* cited by examiner

SYSTEM AND METHOD FOR PRIORITIZATION OF NETWORK TRAFFIC ACROSS MULTIPLE WIRELESS OPTIONS

This application is a continuation of prior application Ser. No. 16/779,493 entitled "SYSTEM AND METHOD FOR PRIORITIZATION OF NETWORK TRAFFIC ACROSS MULTIPLE WIRELESS OPTIONS," filed on Jan. 31, 2020, which is assigned to the current assignee hereof and is incorporated herein by reference in its entirety.

FIELD OF THE DISCLOSURE

The present disclosure generally relates to information handling systems and more specifically relates to information handling systems that facilitate network traffic prioritization within a multi-channel communication network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
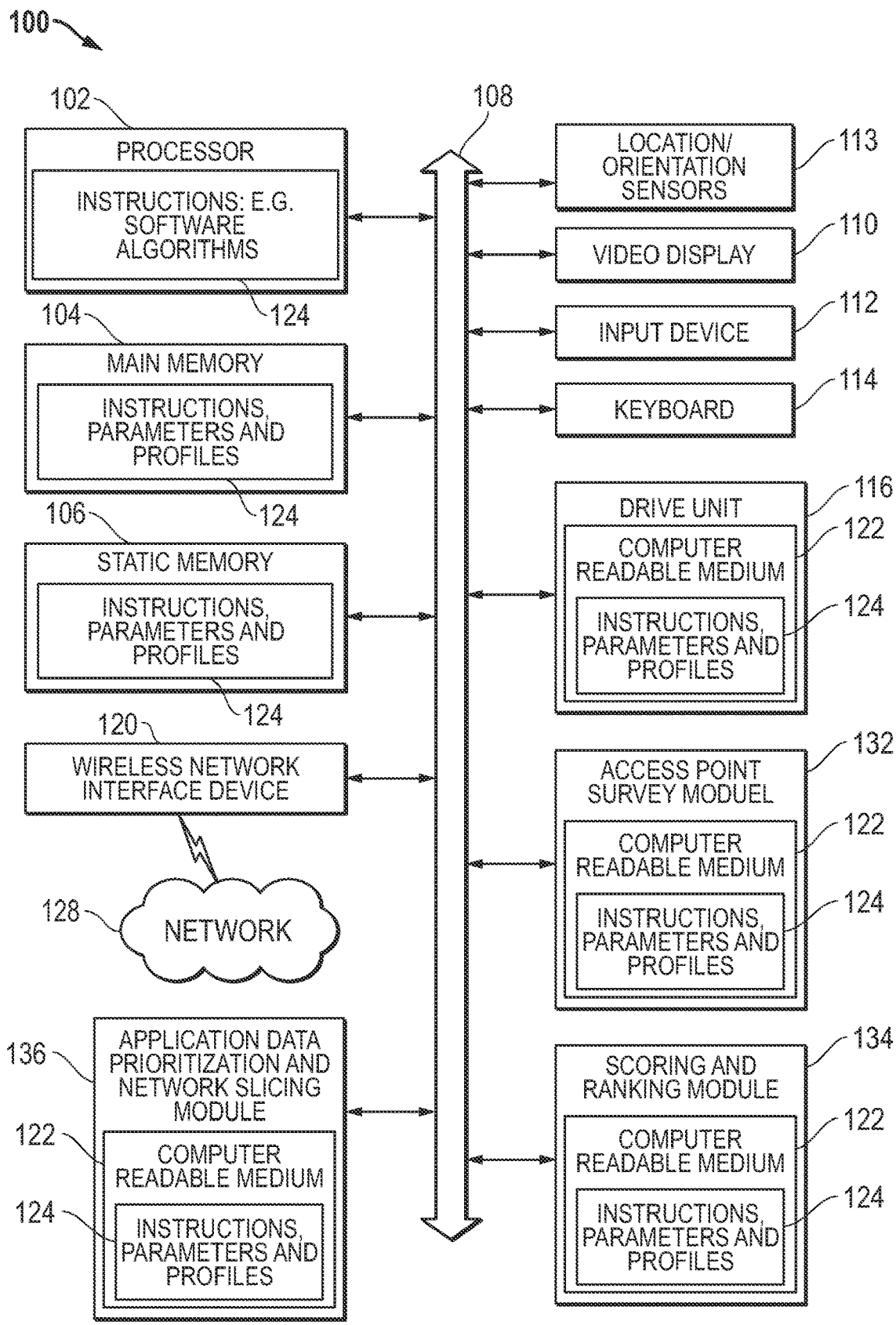
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system, may include a processor; a memory; an access point survey module to, upon execution of the processor, survey a plurality of access points distributed across a multi-channel communication network to, based on the type of wireless protocol network the access points are communicatively coupled to, determine and assign a numerical value to the access point characteristics based on: a signal-to-noise ratio between the information handling system and each of the plurality of the access points; a signal strength between the information handling system and each of the plurality of the access points; a reference signals received power (RSRP) measurement; a reference signal received quality (RSRQ) measurement; a connection speed; a retry rate at each access point; and network channel contention at the access point; and a scoring and ranking module to: calculate a score based on the determined numerical values; aggregate the numerical values associated with each access point and rank each access point based on the aggregated score; and assign communication to a highest scored access point. The information handling system described herein may also be referred herein as an endpoint device that includes a processor and a memory and that is used to communicate over one of a plurality of communication networks. The information handling system may include any type of antenna system used to connect to any type of access point such as a Wi-Fi-enabled access point, a private and public long-term evolution (LTE)-enabled access point, and a 5G new radio (NR)-enabled access point. With the information handling system described herein, robust prioritization processes may be implemented that takes into account multiple communication networks and other meta-factors to achieve bandwidth optimization and optimal connection paths.

As described herein, the information handling system may achieve bandwidth optimization and optimal connection paths through the use of a process that, via execution of the access point survey module, scores each access point (AP) based on the characteristics associated with the AP such as a signal-to-noise ratio between the information handling system and each of the plurality of the APs, a signal strength between the information handling system and each of the plurality of the APs, a reference signals received power (RSRP) measurement, a reference signal received quality (RSRQ) measurement, a connection speed, a retry rate at each AP, and network channel contention at the AP. With the data related to these characteristics the information handling system may then be able to score each AP and communicatively couple to the AP that would be most beneficial to the data transmissions from the information handling system. According to some embodiments, the type of data to be transmitted and/or the type of application used to transmit that data may be categorized and used to determine which among the plurality of APs the information handling system is to be communicatively coupled to. For example, remote user interface, gaming, and low-latency requiring data transmissions and applications may be assigned to those APs that have the fastest connection. Whereas, in these examples where non-time-critical data is to be transmitted, the information handling system may be communicatively coupled to an AP that may have slower connectivity so that network congestion and/or network channel congestion is reduced across the multi-channel communication network for particular categories of application data. An application data prioritization data and network slicing module according to embodiments of the present disclosure may virtualize the connections and slice wireless network connections to one or more APs. The embodiments herein may prioritize data streams or applications used to generate and transmit data types by categorization and select network slices with APs for prioritization levels based on latency, bandwidth and other needs of the categorized data.

In some embodiments, the network connections available may include a wired local area network (LAN) communication network, a Wi-Fi communication network (e.g., 2.4 GHz band, 5.0 GHz band, among other bands), and any citizens broadband radio service (CBRS) communication network. Any of the plurality of APs to which the information handling system may be communicatively coupled to may be APs associated with any of these types of communication networks and the selection of an AP for network slices may be based on the type of communication network that the AP is associated with and its score.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices, such as a keyboard, a mouse, a video/graphic display, or any combination thereof. The information handling system 100 may also include one or more buses operable to transmit communications between the various hardware components. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of the access point survey module 132, scoring and ranking module 134, and drive unit 116 (volatile (e.g. random-access memory, etc.), nonvolatile (read-only memory, flash memory etc.) or any combination thereof). The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input, and a keyboard 114. The information handling system 100 may also include a disk drive unit 116.

The wireless network interface device 120 may be a wireless adapter that may provide connectivity to any communication network 128, e.g., a wide area network (WAN), a local area network (LAN), wireless local area network (WLAN), a wireless personal area network (WPAN), a wireless wide area network (WWAN), a 5G mm-wave or new radio (NR) communication network, a private long-term evolution (LTE) communication network, a public LTE communication network, public Wi-Fi communication network, a private Wi-Fi communication network, or other networks described herein. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN standards, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. Frequencies related to the 5G networks may include high frequency (HF) band, very high frequency (VHF) band, ultra-high frequency (VHF) band, L band, S band, C band, X band, Ku band, K band, Ka band, V band, W band, and millimeter wave bands. For example, a 5G access point 140 may include those RF bands that emit RF waves either below 6 GHz (e.g., FR1) or higher than 6 GHz (e.g., FR2).

Wireless network interface device 120, in an embodiment, may connect any endpoint device to one or more types of access points in a multichannel network supporting a plurality of wireless protocol networks using a plurality of radio frequency (RF) bands such as described herein. In an embodiment, the wireless network interface device 120 may be communicatively coupled to an array of antennas used to provide a communication channel to an endpoint device, via an access point, with a communication channel found on any wireless communication network of the multichannel network described herein. For example, the antennas may support a 5G wireless communication protocol, a Wi-Fi communication protocol, and a private or public LTE wireless communication protocol so that relatively higher amounts of data may be transmitted between the endpoint devices 100, through the access points to any communication network to which the information handling system 100 is communicatively coupled.

The wireless network interface device 120 may further include an antenna front end system which may operate to modulate and demodulate signals, set signal transmission power levels or sensitivity to signal reception, select channels or frequency bands, and conduct other functions in support of a wireless transmission from the access point and to a communication network. The antenna front end and radio support systems and modules may, for example, monitor wireless signal quality conditions or data conditions in communications in some example embodiments. An antenna adaptation controller may be part of the wireless network interface device 120 and may execute instructions as disclosed herein for assisting with monitoring wireless link state information, endpoint configuration data, network slice data, access point load data, or other input data to generate channel estimation and determine antenna radiation patterns. For example, instructions or a controller may execute software or firmware applications or algorithms which utilize one or more wireless links for wireless communications via the wireless interface adapter(s) 120 and the plurality of antenna systems for the plurality of supported wireless protocols as well as other aspects or components.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute an access point survey module 132, a scoring and ranking module 134, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the access point survey module 132 and scoring and ranking module 134 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including an estimated training duration table. The disk drive unit 116 and static memory 106 may also contain space for data storage. Further, the instructions 124 may embody one or more of the methods or logic as described herein. For example, instructions relating to the access point survey module 132 and scoring and ranking module 134 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the access point survey module 132 and scoring and ranking module 134 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The access point survey module 132 and scoring and ranking module 134 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may include the access point survey module 132 that may be operably connected to the bus 108. The access point survey module 132 computer readable medium 122 may also contain space for data storage. The access point survey module 132 may, according to the present description, perform tasks related to surveying a plurality of APs distributed across a multi-channel communication network to, based on the type of wireless protocol network the access points are communicatively coupled to, determine and assign a numerical value to the access point characteristics. In some embodiments, the access point characteristics may include a signal-to-noise ratio between the information handling system and each of the plurality of the access points; a signal strength between the information handling system and each of the plurality of the access points; a reference signals received power (RSRP) measurement; a reference signal received quality (RSRQ) measurement; a connection speed; a retry rate at each access point; and network channel contention at the access point, among other characteristics. Measurement of these wireless signal condition and data transfer assessment values may be monitored by the wireless network interface device 120 as described. These measurements may be tracked over time in some embodiments. In other embodiments, these factors may be monitored in near real-time. The factors assessed may depend on the type of wireless protocol.

In an embodiment, the access point survey module 132 may determine and assign a numerical value to any given access point based on characteristics associated with a specific type of AP. For example, for an LTE-enabled AP, the access point survey module 132 may determine the RSRP measurement, the RSRQ measurement, and the SNR. As used in the present specification and in the appended claims, an LTE-enabled AP may be any access point that is or is capable of communicatively coupling the information handling system 100 to a private or public LTE communication network. The information handling system 100 may, therefore, include one or more LTE antennas that allow for LTE communication to the LTE-enabled AP, such as an eNodeB AP.

In an embodiment, for a Wi-Fi-enabled AP, the access point survey module 132 may determine the signal strength of the signal between the information handling system 100 and the Wi-Fi-enabled AP, the SNR, a channel contention at the Wi-Fi-enabled AP descriptive of the available bandwidth across the Wi-Fi-enabled AP, a retry rate of the Wi-Fi-enabled AP, and a connection speed at the Wi-Fi-enabled AP. As used in the present specification and in the appended claims, a Wi-Fi-enabled AP may be any access point that is or is capable of communicatively coupling the information handling system 100 to a private or public Wi-Fi communication network. The information handling system 100 may, therefore, include one or more Wi-Fi antennas in example embodiments that allow for Wi-Fi communication to the Wi-Fi-enabled AP.

In an embodiment, for a 5G NR-enabled AP, the access point survey module 132 may determine any one of the SNR between the information handling system 100 and the AP, signal strength between the information handling system 100 and the AP, RSRP measurement, RSRQ measurement, a connection speed, a retry rate the AP, and network channel contention at the AP. As used in the present specification and in the appended claims, a 5G NR-enabled AP may be any access point that is or is capable of communicatively coupling the information handling system 100 to a 5G NR communication network. The information handling system 100 may, therefore, include a mm-wave antenna or mm-wave antenna array that allows for 5G communication to the 5G NR-enabled AP, such as a gNodeB AP.

In an embodiment, the access point survey module 132 may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

The information handling system 100 may include the scoring and ranking module 134 that may be operably connected to the bus 108. The scoring and ranking module 134 computer readable medium 122 may also contain space for data storage. The scoring and ranking module 134 may, according to the present description, perform tasks related to aggregating the numerical values associated with each access point and rank each access point based on an aggregated score based on the determined numerical values. The scoring and ranking module 134 may also perform the tasks related to assigning communication for a network slice from the wireless network interface device 120 to an access point channel based on the aggregated scores of the access point.

In an embodiment, the scoring and ranking module 134 may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In an embodiment, the scoring and ranking module 134 may score each Wi-Fi-enabled AP based on the characteristics surveyed by the access point survey module 132. An example scoring regime implemented by the scoring and ranking module 134 for Wi-Fi enabled AP is presented below in Table 1.

TABLE 1

| Retry Rate (%) | Connection Speed | Channel Quality #AP on same channel | SNR | Signal Strength (dB) | Quality | Points |
|---|---|---|---|---|---|---|
| | Max. rate ~865 Mbps maps to 3 pts and linearly decrease to 0 | 0 | >75 | >−50 | Excellent | 3 |
| | | 1 | 50 to 75 | −50 to −70 | Good | 2 |
| | | | 25 to 50 | −70 to −80 | Fair | 1 |
| Max rate is 100% and maps to 0 and increases linearly to 3 for no retries/loss | | >=2 | <25 | <−80 | Poor | 0 |

In an embodiment, the scoring and ranking module 134 may score each LTE-enabled AP based on the characteristics surveyed by the access point survey module 132. An example scoring regime implemented by the scoring and ranking module 134 is presented below in table 2.

TABLE 2

| SINR (dB) | RSRQ (dB) | RSRP (dBm) | Quality | Points |
|---|---|---|---|---|
| >12.5 | >−5 | >−84 | Excellent | 3 |
| 10 to 12.5 | −6 to −10 | −85 to −102 | Good | 2 |

TABLE 2-continued

| SINR (dB) | RSRQ (dB) | RSRP (dBm) | Quality | Points |
|---|---|---|---|---|
| 7 to 10 | −6 to −10 | −103 to −121 | Fair | 1 |
| <7 | <−11 | <−122 | Poor | 0 |

It is understood that the example signal and data factors shown in Table 1 and Table 2 are example data ranges and any data ranges may be used. Further, the selection of signal factors and data factors used for scoring by the scoring and ranking module 134 may be any known signal factors or data factors measured for the LTE protocols, Wi-Fi protocol, or 5G protocols supported and assessed by the wireless network interface device 120 of the information handling system 100.

In an embodiment, the information handling system 100 may include a recalculation policy module (not shown). In this embodiment, the recalculation policy module may define an interval time to resurvey the plurality of access points distributed across a multi-channel communication network and recalculate the score. The recalculation policy module may iteratively cause the processor 102 or other processing device to carry out the resurveying process in order to communicatively couple the information handling system 100 to an AP that will provide the information handling system 100 with the best communication service available at any given communication network. In an embodiment, the recalculation policy module may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory.

In an embodiment, the information handling system 100 may further include an information handling system location module (not shown). The information handling system location module may detect a change in location of the information handling system, determine that the change is location exceeds a threshold distance, and a recalculation policy module to resurvey the plurality of access points distributed across a multi-channel communication network and recalculate the score. Because the information handling system 100 may be a portable device such as a smartphone or laptop computer, as the information handling system 100 is moved physically within a space, the connection between any give AP may be degraded as a distance is increased between the information handling system 100 and the AP. The information handling system location module may detect this movement via location sensors 113 and, once a threshold distance has been traversed, initiate the recalculation policy module to resurvey the plurality of access points distributed across a multi-channel communication network and recalculate the score. The information handling system location module may be communicatively coupled to any number of location sensors 113 within the information handling system 100 so that the location of the information handling system 100 may be determined. The data from these location sensors 113 may be provided to the information handling system location module to determine whether the threshold distance has been traversed. Example location sensors 113 may include a gyroscope, a global positioning satellite (GPS) system, and an accelerometer, among other types of location sensors 113. Again, the information handling system location module allows the information handling system 100 to be communicatively coupled to an AP that will provide the information handling system 100 with the best communication service available at any given communication network. In an embodiment, the information handling system location module may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory.

In an embodiment, the information handling system 100 may further include a prioritization module of an application data prioritization and network slicing module 136. The prioritization module may prioritize data streams sent from the information handling system to the APs into a plurality of network slices for communication to the APs. For example, the data transmitted from the information handling system 100 to any given AP may include streaming data. As described in more detail below, the prioritization module may interface with, for example, a virtual Wi-Fi driver that manages a plurality of virtual adapters. Each virtual adapter may be dedicated to a particular data such as the streaming data such that the virtual adapters are used to mimic network slicing at a Wi-Fi-enabled AP. In this embodiment, the Wi-Fi-enabled AP may include a plurality of basic service set identifiers (BSSIDs) that allow for independent configuration of the parameters on a per BSSID basis to establish network slices for Wi-Fi. connections. This enables the isolation of different types of traffic, such as the streaming traffic, at the Wi-Fi-enabled AP. Other types of data traffic are contemplated such as browsing data traffic, downloading data traffic, wireless broadband data traffic, real-time control data traffic, and internet-of-things (IoT) related traffic data. Each of these types of data traffic may be passed through its own virtual adapter managed by the virtual Wi-Fi driver such that a Wi-Fi antenna may sequentially switch between the information handling system 100 and the Wi-Fi-enabled AP. Consequently, the information handling system 100 includes the ability to virtualize a Wi-Fi card in order to expose multiple virtual adapters for a corresponding number of BSSID at the Wi-Fi-enabled AP. In an embodiment, the prioritization module of the application data prioritization and network slicing module 136 may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory.

In an embodiment, the information handling system 100 may include an application prioritization module of the application data prioritization and network slicing module 136. The application data prioritization and network slicing module may inventory the applications used to transmit data from the information handling system 100 to the APs and prioritize transmissions of data into plural network slices based on the category of application used to transmit the data. In an embodiment, the categories of applications may include streaming applications, browsing applications, and data downloading applications. In an embodiment, the streaming applications, for example, may be given first priority to transmit data to the AP. If the information handling system 100 has a wired LAN connection, a preference may be given to route streaming data traffic over the wired LAN interface because a wired LAN connection may be faster than a wireless connection to an AP. This may delegate other content over the WLAN interfaces as described herein. The data traffic over the WLAN interfaces may be prioritized and sent according to the scoring and ranking values determined by the scoring and ranking module 134. In an embodiment, the application data prioritization and network slicing module may communicate with the main memory 104, the processor 102, the video display 110, the alpha-numeric input device 112, and the wireless network interface device 120 via bus 108, and several forms of communication may be used, including ACPI, SMBus, a 24 MHZ BFSK-coded transmission channel, or shared memory.

In an embodiment, the information handling system 100 may include a network slicing module of the application data prioritization and network slicing module 136. The network slicing module may form network slices based on a plurality of application categories defining applications used to transmit data from the information handling system to the APs. Again, the categories of applications used to transmit data selected from may include a streaming application category, a browsing application category, and a data download application category. With this information a slice prioritization module of the application data prioritization and network slicing module 136 for the information handling system 100 may prioritize data traffic over the network slices networks based on the category of application used to transmit that data. In an embodiment, the information handling system 100 may include a 5G NR antenna or array of antennas used to communicate with an AP via a 5G mm-wave communication protocol. When communicatively coupled to a 5G network, the information handling system 100 may request that the three (or more) categories (e.g., streaming application category, a browsing application category, and a data download application category) are each assigned a network slice by the processors of the APs such that the behaviors and functionalities required for each of these categories of slices may be met. The APs would have been selected by aggregated score for metrics of data and wireless signal factors monitored for a connection with the information handling system 100. For example, a streaming network slice may be allocated those resources that would result in high throughput. In this example, the streaming network slice may be given prioritized traffic resources above those for other categories of slices. Because this network slicing feature is native to the operation of the 5G NR antenna systems, the categorization of the applications prior to transmission may allow for higher data throughput for those applications that have high data traffic requirements.

In an embodiment, the information handling system 100 may include a Wi-Fi virtualization module (not shown). The Wi-Fi virtualization module may be executed by the processor 120 in order to create a plurality of virtual adapters to isolate different types of data traffic from the information handling system 100 to the APs to be associated with a plurality of basic service set identifiers (BSSIDs) at the access point to create the network slice for Wi-Fi data communications. Again, in an embodiment, the Wi-Fi-enabled AP may include a plurality of basic service set identifiers (BSSIDs) that allow for independent configuration of the parameters on a per BSSID basis. This enables the isolation of different types of traffic, such as the streaming traffic, at the Wi-Fi-enabled AP by the Wi-Fi virtualization module.

In an embodiment, the information handling system 100 may include a weighting module (not shown). The weighting module may assign weights to the different parameters described herein on each of the available types of communication networks available to the information handling system 100 via the types of APs (e.g., Wi-Fi-enabled AP, 5G NR-enabled AP, and LTE-enabled AP, among others). These weights may be provided from the weighting module to the scoring and ranking module 134 so that the scoring and ranking module 134 may incorporate these weights as the scoring and ranking module 134 calculates the score based on the determined numerical values. In an embodiment, the weighting module may communicate with the main memory 104, the processor 102, the video display 110, the alphanumeric input device 112, and the wireless network interface device 120 via bus 108, and several forms of communication may be used, including ACPI, SMBus, a 24 MHZ BFSK-coded transmission channel, or shared memory.

In an embodiment, the information handling system 100 may include a security module (not shown). The security module may receive data from the access point survey module 132 descriptive of a level of security available on any given surveyed communication network. The security module may also receive an IT policy related to the transmission of certain types of data and selectively allows or prevents the transmission of, for example, highly restricted data. In an embodiment, the highly restricted data may be only transmitted over a private LTE communication network using a private LTE-enabled AP. In this embodiment, the security module may restrict transmission of this highly restricted data across any communication network until the security module has verified that a secure network such as the private LTE communication is accessible via the private LTE-enabled AP. The security module may also direct that relatively less-sensitive data (e.g., browsing data) be transmitted over, for example, a public Wi-Fi-enabled AP and communication network or public LTE-enabled AP and communication network. The information handling system 100 may implement any preexisting security software along with the security module to arbitrate which data may be transmitted to and over any given communication network thereby increasing the security of the data at the information handling system 100. If the information handling system 100 seeking to transmit data traffic that requires a secure transmission does not have access to a communication network that has sufficient security, the information handling system 100 may queue that data traffic until a secure communication network AP is available. The following example Table 3 may be referenced by the security module and information handling system 100 to determine the appropriate communication network for any given data traffic. Table 3 is a set of example entries and data and may be modified or altered according to various embodiments herein.

TABLE 3

| | Customer Communications | External Public | Internal Use | Restricted | Highly Restricted |
|---|---|---|---|---|---|
| Private LTE communication network | Enabled | Enabled | Enabled | Enabled | Enabled |
| Corporate Wi-Fi communication network | Enabled | Enabled | Enabled | Enabled | With VPN |
| Public LTE communication network | Enabled | Enabled | With VPN | With VPN | Disabled |
| Public Wi-Fi communication network | Enabled | Enabled | With VPN | Disabled | Disabled |
| Bluetooth communication network | Enabled | Enabled | Disabled | Disabled | Disabled |

In an embodiment, the various modules of the information handling system 100 allow for the routing of data traffic to a communication network and topology that would best suit the requirements for that data traffic. In the specific embodiments where the type of application used to transmit the data determines the type of communication network to couple the information handling system 100 to, the content may be appropriately matched to a communication network that may handle that type of data appropriately. In an embodiment, multiple communication networks may be used to route multiple data connections from a single information handling system 100 according to the data traffic's priorities (e.g., latency, bandwidth requirements, security requirements, reliability, and quality of service (QoS)).

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
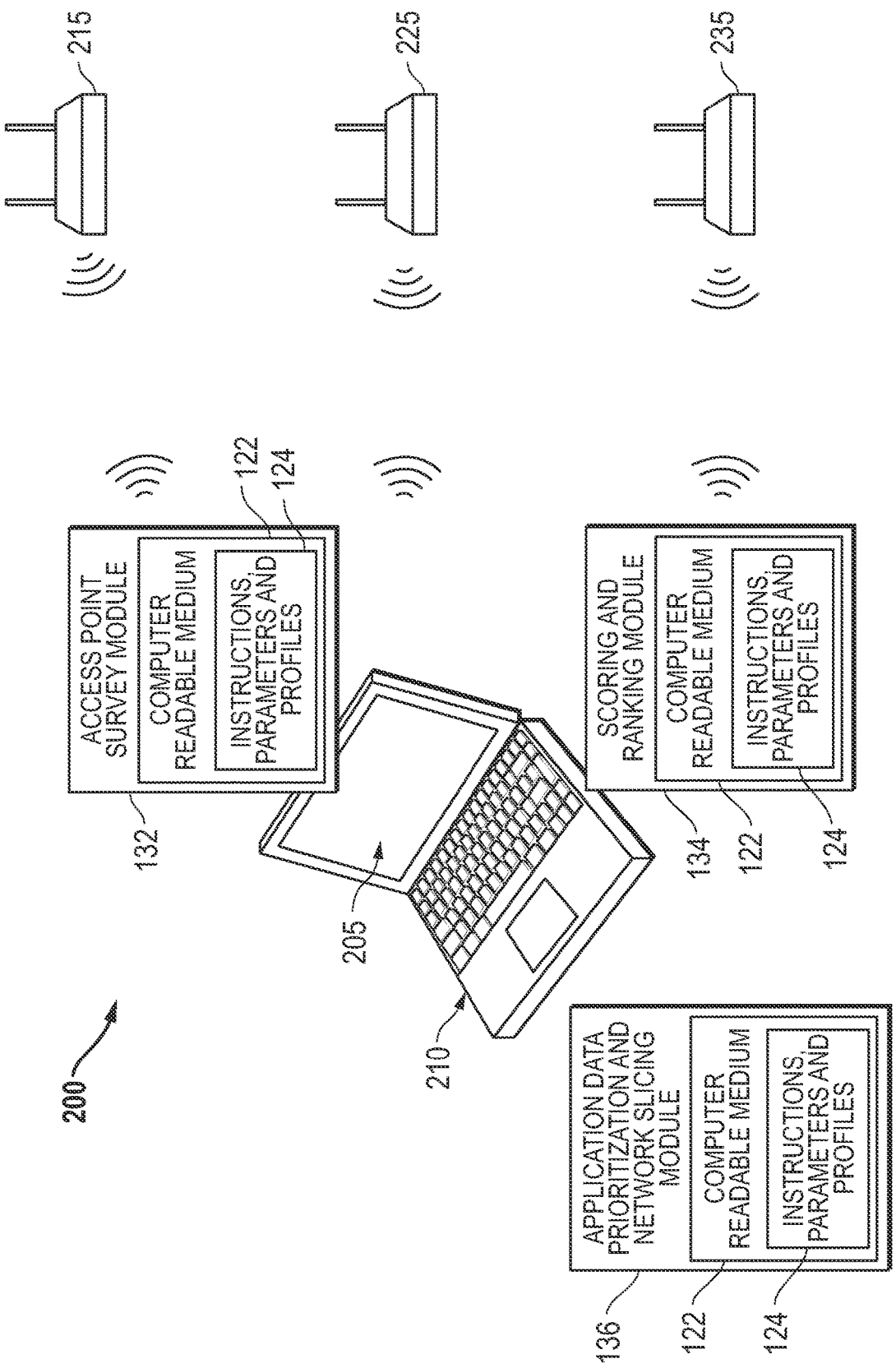
FIG. 2 is a graphical diagram illustrating an information handling system interfacing with a plurality of access points according to an embodiment of the present disclosure.

FIG. 2 is a graphical diagram illustrating an information handling system 200 interfacing with a plurality of access points 215, 225, 235 according to an embodiment of the present disclosure. Although FIG. 2 shows that the information handling system 200 is or may be communicatively coupled to three access points 215, 225, 235, the number of access points 215, 225, 235 that the information handling system 200 may be communicatively coupled to either concurrently or sequentially may vary and may, in some embodiments, depend on the number and type of antenna systems within the information handling system 200. For example, the information handling system 200 may include a Bluetooth antenna system, a 5G NR antenna system (e.g., mm-wave antenna system), an LTE antenna system, and a CBRS antenna system, among other types of antenna systems that may establish a communication with an AP 215, 225, 235.

The information handling system 200 of FIG. 2 is shown to be a laptop-type computing device. However, the present specification contemplates that any type of computing device may be used without going beyond the scope of the principles described herein. The information handling system 200, in this embodiment, includes a display portion 205 and a keyboard portion 210. The keyboard portion 210 includes a number of actuatable keys that allows a user to provide input to the information handling system 200. Via interaction with the keyboard portion 210 by a user, the user may input data into the information handling system 200 and receive output from the screen portion 205.

The information handling system 200 includes an access point survey module 132. As described herein, the access point survey module 132 may perform tasks related to surveying a plurality of APs 215, 225 235 distributed across a multi-channel communication network to, based on the type of wireless protocol network the APs 215, 225 235 are communicatively coupled to, determine and assign a numerical value to the access point characteristics. The AP characteristics related to any given AP 215, 225 235 may be dependent on the type of AP being surveyed. For example, a first AP 215 may be associated with a specific type of communication network such as a 5G NR communication network. This would make the first AP 215 a 5G NR-enabled AP 215 that is capable of sending and receiving data packets at a mm-wave frequency. As may be appreciated, this mm-wave frequency may include frequency range (FR) 1 and FR 2 frequencies that allow for relatively large amounts of data to be transmitted across the 5G NR communication network. In the examples where the data to be transmitted includes streaming data, the communicative coupling of the information handling system 200 to this first AP 215 may allow for increased rates of throughput allowing for low-latency transceiving of data to and from the information handling system 200. In order to access the first AP 215, therefore, the information handling system 200 may include a 5G NR antenna system that may include one or more 5G mm wave antennas that may transceive data at the FR1 and FR 2 frequency ranges.

As the access point survey module 132 surveys the first AP 215, therefore, the access point survey module 132 may determine, for example, the 5G mm-wave transmission capabilities of the first AP 215 as well as other characteristics such as any existing channel contention present at the first AP 215, a connection speed at the first AP 215, a SNR between the first AP 215 and the information handling system 200, among other characteristics described herein.

Similarly, where a second AP 225 is associated with a specific type of communication network such as a public or private LTE communication network, the second AP 225 may be an LTE-enabled AP 225 that is capable of sending and receiving data packets at those frequencies associated with LTE transmissions. As may be appreciated, these frequencies may include a plurality of frequency bands that allow for certain amounts of data to be transmitted across the LTE communication network that has a relatively larger range than a 5G NR communication network. In the examples where the data to be transmitted includes data that is dependent on signal quality, the communicative coupling of the information handling system 200 to this second AP 225 may allow for increased signal reliability during transceiving of data to and from the information handling system 200. In order to access the second AP 225, therefore, the information handling system 200 may include an LTE antenna system that may include one or more LTE wave antennas that may transceive data at those LTE frequency ranges.

As the access point survey module 132 surveys the second AP 225, therefore, the access point survey module 132 may determine, for example, the LTE-wave transmission capabilities of the second AP 225 as well as other characteristics such as a SNR between the second AP 225 and the information handling system 200, a RSRP measurement, and a RSRQ measurement, among other characteristics described herein.

A third AP 235 may be associated with a specific type of communication network such as a public or private Wi-Fi communication network and may be described as a Wi-Fi-enabled AP 235 that is capable of sending and receiving data packets at those frequencies associated with Wi-Fi transmissions. As may be appreciated, these frequencies may include 2.4 GHz and 5 GHz or any other frequencies associated with 802.11b, 802.11a, 802.11g, 802.11n, 802.11ac, and 802.11ax IEEE standards, among others. In order to access the third AP 235, therefore, the information handling system 200 may include a Wi-Fi antenna system that may include one or more Wi-Fi wave antennas that may transceive data at those Wi-Fi frequency ranges.

As the access point survey module 132 surveys the third AP 235, therefore, the access point survey module 132 may determine, for example, the Wi-Fi-wave transmission capabilities of the third AP 235 as well as other characteristics such as a SNR between the second AP 225 and the information handling system 200, a signal strength between the third AP 235 and the information handling system 200, a channel contention at the third AP 235, a retry rate of the third AP 235, and a connection speed of the third AP 235, among other characteristics described herein.

During operation of the information handling system 200 and after the access point survey module 132 determines the characteristics of the APs 215, 225 235, the access point survey module 132 may assign a numerical value to those signal and data delivery factors based, for example, on criteria for those factors as set forth in scoring assignment tables used by the scoring and ranking module. An example set of criteria is shown in tables 1 and 2 provided herein as related to the second AP 225 and third AP 235, respectively, in one example embodiment. However, such data criteria in tables 1 and 2 is example data for purposes of illustration and any levels and ratings may be used with wireless protocols for AP 215, AP 225, and AP 235 in contemplated embodiments of the present disclosure. The information handling system 200 may then execute a scoring and ranking module 134 to aggregate the numerical values associated with each APs 215, 225 235 and rank each AP 215, 225 235 based on an aggregated score based on the determined numerical values.

The scoring and ranking module 134 may also assign communication for a network slice from the wireless network interface to an access point channel based on the aggregated scores of the access point. In an embodiment, a network slicing module of the application data prioritization and network slicing module 136 may form network slices based on a plurality of application categories assigned to data streams or applications used to transmit data from the information handling system to the access points as described herein. For example, application categories may be based on latency and bandwidth needs relating to various application data types to be transmitted. Thus, along with communicatively coupling the information handling system 200 to any given AP 215, 225 235, in some embodiments, the scoring and ranking module 134 and the application data prioritization and network slicing module 136 may also assign a network slice for data transmission based on the application used to transmit that data.

Where the data is to be transmitted via the third AP 235 (a Wi-Fi-enabled AP), the information handling system 200 may include a Wi-Fi radio or antenna system that is used to communication with the third AP 235 using the frequencies described herein. Further, the W-Fi radio may interface with a virtual Wi-Fi driver. A virtual Wi-Fi driver may allow the information handling system 200 to be communicatively coupled to the third AP 235 that includes a plurality of BSSIDs. In a particular embodiment, the virtual Wi-Fi driver may create a plurality of virtual adapters used to specifically handle data transmission associated with, for example, streaming applications, browsing applications, and data downloading applications. In this embodiment, three virtual adapters may be created by the virtual Wi-Fi driver so that these three types of data may be sequentially switched and transmitted by the information handling system 200 to three basic service sets (BSS) identified by distinct BSSIDs at the third AP 235. As described herein, this allows the information handling system 200 to isolate the different types of data traffic and treat the virtual Wi-Fi driver as an apparatus that mimics a network slicing process.

Where the data is to be transmitted via the first AP 215 (a 5G-enabled AP), the information handling system 200 may send a request to the first AP 215 requesting that the data associated with the three categories of applications (e.g., streaming applications, browsing applications, and data downloading applications) are each assigned a network slice at the 5G communication network that includes behavior and functionalities to handle the data transceived. By way of example, the data associated with the streaming applications may be associated with a network slice that includes resources to maintain a high throughput and is prioritized over other data traffic on other network slices formed. The streaming applications may include applications that handle video streaming, audio streaming, online gaming, and other types of real-time and constant transmission and reception of data to and from the information handling system 200.

Additionally, the data associated with the browsing application may be associated with a network slice that includes resources to increase the security transmissions with an acceptable level of quality of service and relatively low-latency. The browsing applications may include those applications that handle the processes of accessing information on the world wide web which may include, in some examples, the transmission of sensitive information such as passwords, bank account numbers, credit card information, among others. In some embodiments, the data associated with the browsing applications may be relegated to communication networks other than high-throughput communication networks such as a 5G NR communication network.

Figure 3:
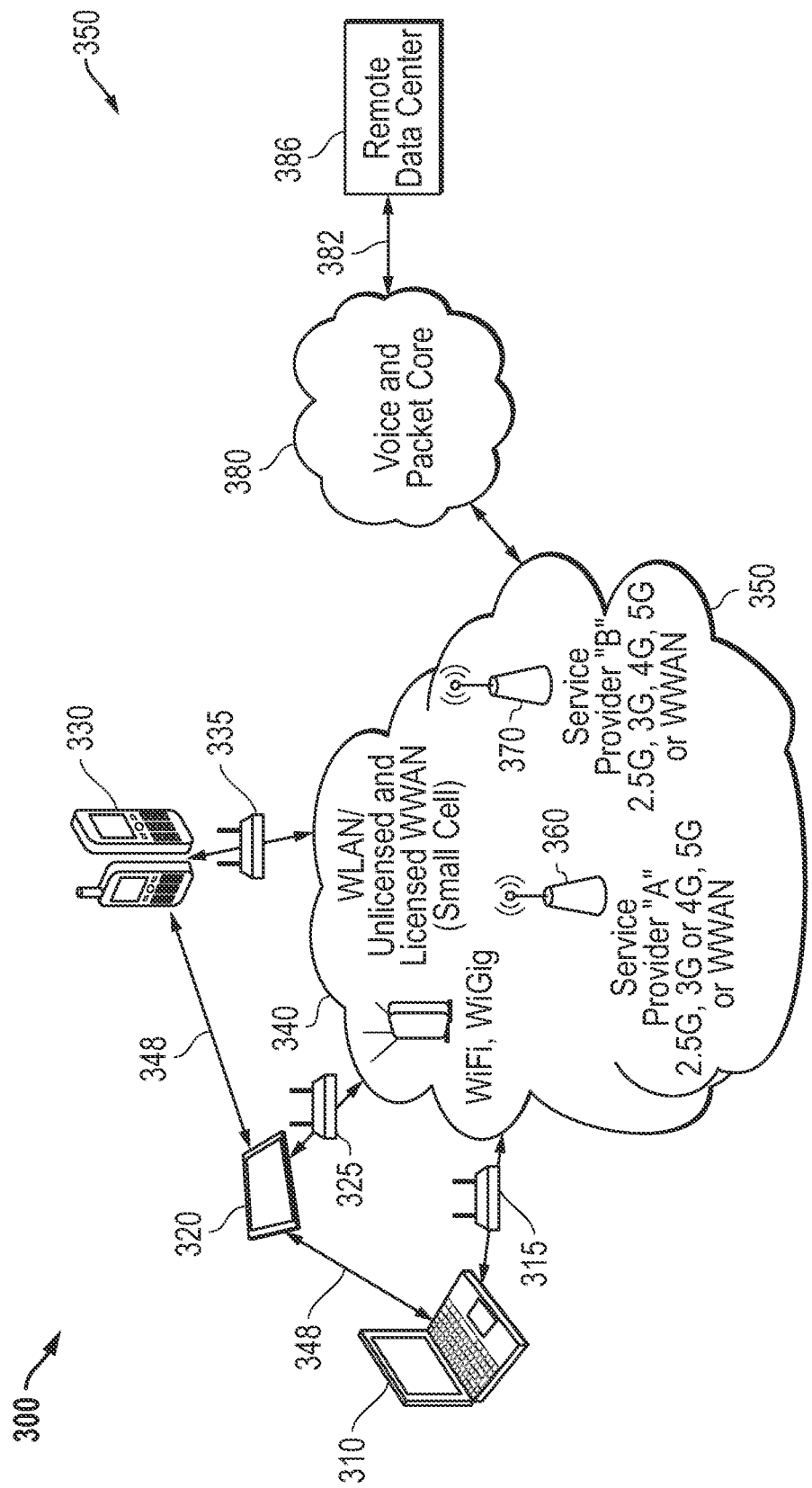
FIG. 3 is a block diagram of a network environment offering several wireless communication protocol options and mobile information handling systems according to an embodiment of the present disclosure.

Still further, the downloading applications may include those applications that update software at the information handling system 200 and the transmission of large files. The data associated with the downloading application may be associated with a network slice that includes those resources to reduce packet loss, prevent transmission delays, and support the ability to access remote software resources. By categorizing the applications, the information handling system 200 may improve the reliability for those applications that may be involved in high levels of data transmission and provide resources to reduce any latency when necessary while also providing features related to, for example, data security and QoS considerations. FIG. 3 is a block diagram of a network environment 300 offering several wireless communication protocol options and mobile information handling systems 310 320, 330 according to an embodiment of the present disclosure. FIG. 3 illustrates a network 300 that may include one or more information handling systems 310, 320, 330 that may include the information handling system described in connection with FIG. 1. In a particular embodiment, network 300 includes networked mobile information handling systems 310, 320, and 330, 5G wireless access points such as gNodeB, Wi-Fi access points, eNodeB small cell LTE or other LTE access points, and other multiple wireless connection link options. A variety of additional computing resources of network 300 may include client mobile information handling systems, data processing servers, network storage devices, local and wide area networks, or other resources as needed or desired. As partially depicted, systems 310, 320, and 330 may be a laptop computer, tablet computer, 360-degree convertible systems, wearable computing devices, a smart phone device or other computing devices. These mobile information handling systems 310, 320, and 330, may access a wireless local network 340, or they may access a macro-cellular network 350 via the access points 315, 325, 335. As described herein, the APs 315, 325, 335 may include Wi-Fi-enabled access point, private and public long-term evolution (LTE)-enabled access points, and 5G new radio (NR)-enabled access points. Although FIG. 3 illustrates three APs 315, 325, 335, the present specification contemplates that the number of APs 315, 325, 335 may be more or less than three in order to form a multi-channel network that includes a Wi-Fi network, a 5G network, and an LTE network, among others. In an example, the wireless local network 340 may be the wireless local area network (WLAN), a wireless personal area network (WPAN), or a wireless wide area network (WWAN). In an example embodiment, LTE-LAA WWAN may operate with a small-cell WWAN wireless access point option.

Components of a wireless local network may be connected by wireline or Ethernet connections to a wider external network. For example, wireless 5G NR-enabled APs 315, 325, 335 may be connected to a wireless network controller and an Ethernet switch. Wireless communications across wireless local network 340 may be via standard protocols such as IEEE 802.11 Wi-Fi, IEEE 802.11ad WiGig, IEEE 802.15 WPAN, or 5G small cell WWAN such as gNodeB, or small cell LTE WWAN communications such as eNodeB, IEEE 802.11, IEEE 1914/1904, IEEE P2413/1471/42010, APs 315, 325, 335 implementing 802.11b, 802.11a, 802.11g, 802.11n, 802.11ac, and 802.11ax IEEE standards, or similar wireless network protocols developed for 5G, LTE, and Wi-Fi communications.

Alternatively, other available wireless links within network 300 may include macro-cellular connections 350 via one or more service providers 360 and 370. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 340 and macro-cellular network 350 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 310, 320, or 330 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that the beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portion of wireless network 350 access points for Wi-Fi or WiGig as well as small cell WWAN connectivity may be available in emerging 5G technology. This may create situations where a plurality of antenna systems are operating on a mobile information handling system 310, 320 or 330 via concurrent communication wireless links on both WLAN and WWAN or multiple concurrent wireless link to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas. The present disclosure further leverages this extended set of wireless protocol network options on plural antenna systems deployed in endpoint information handling systems to efficiently and effectively utilize an available multichannel network. For example, embodiments of the present disclosure may establish virtualized network slices and associate prioritized data options to one or more ranked APs of various wireless protocol networks. Prioritization of application categorized data may be made based on bandwidth, latency, signal quality, data delivery factors, security, and various other factors as described in embodiments herein.

The voice and packet core network 380 may contain externally accessible computing resources and connect to a remote data center 386. The voice and packet core network 380 may contain multiple intermediate web servers or other locations with accessible data (not shown). The voice and packet core network 380 may also connect to other wireless networks similar to 340 or 350 and additional mobile information handling systems such as 310, 320, 330 or similar connected to those additional wireless networks. Connection 382 between the wireless network 340 and remote data center 386 or connection to other additional wireless networks may be via Ethernet or another similar connection to the world-wide-web, a WAN, a LAN, or other network structure. Such a connection 382 may be made via an access point/Ethernet switch to the external network and be a backhaul connection. The access point may be connected to one or more wireless access points before connecting directly to a mobile information handling system or may connect directly to one or more mobile information handling systems 310, 320, and 330. Alternatively, mobile information handling systems 310, 320, and 330 may connect to the external network via base station locations at service providers such as 360 and 370. These service provider locations may be network connected via backhaul connectivity through the voice and packet core network 380.

Remote data centers may include web servers or resources within a cloud environment that operate via the voice and packet core 380 or other wider internet connectivity. For example, remote data centers may include additional information handling systems, data processing servers, network storage devices, local and wide area networks, or other resources as needed or desired. Having such remote capabilities may permit fewer resources to be maintained at the mobile information handling systems 310, 320, and 330 allowing streamlining and efficiency within those devices. In an example where the mobile information handling system 310, 320, and 330 includes streaming applications or other high data throughput application, those processing resources at the remote data centers may supplement the high volume of processing used to provide those processes described herein. Similarly, remote data center permits fewer resources to be maintained in other parts of network 300.

In some example embodiments herein, remote data centers 286 or other remote information handling systems may be utilized to operate access point survey module 132, scoring and ranking module 134, application data prioritization and network slicing module 136 and other modules of embodiments herein for management of a multichannel network. The remote information handling system, such as an enterprise network management system, may access endpoint device 310, 320, or 330 and APs 315, 325, and 335 and conduct scoring and ranking as well as application data categorization and prioritization across virtualized network slices with a multichannel network for the endpoint information handling system according to some embodiments herein. Aggregated scoring, data prioritization or network slice designations may be transmitted by a remote information handling system for implementation at one or more endpoint information handling system 310, 320, or 330 in some embodiments of the disclosure.

Although APs 315, 325, 335 are shown communicatively coupling wireless adapters of mobile information handling systems 310, 320, and 330 to wireless networks 340 or 350, a variety of wireless links are contemplated. Wireless communication may link through a wireless access point (Wi-Fi or WiGig), through unlicensed WWAN small cell base stations such as in network 340 or through a service provider tower such as that shown with service provider A 360 or service provider B 370 and in network 350. In other aspects, mobile information handling systems 310, 320, and 330 may communicate intra-device via 348 when one or more of the mobile information handling systems 310, 320, and 330 are set to act as, for example, a 5G access point or even potentially a WWAN connection via small cell communication on licensed or unlicensed WWAN connections. Concurrent wireless links to information handling systems 310, 320, and 330 may be connected via any access points including other mobile information handling systems as illustrated in FIG. 3.

Figure 4:
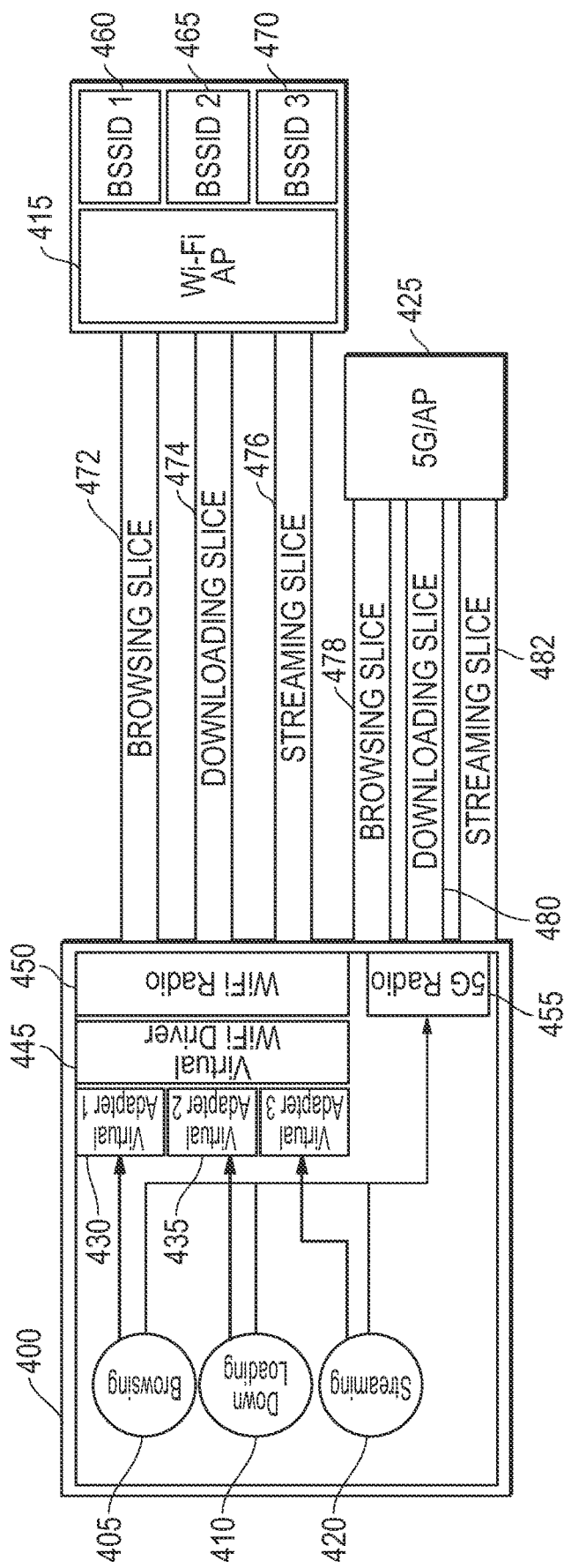
FIG. 4 is a block diagram illustrating sliced network communication between an information handling system and a plurality of access points according to an embodiment of the present disclosure.

FIG. 4 is a block diagram illustrating sliced network communication between an information handling system 400 and a plurality of access points 415, 425 according to an embodiment of the present disclosure. The information handling system 400 may include a plurality of antenna systems such as a Wi-Fi antenna system 450 (e.g., Wi-Fi radio) and a 5G NR antenna system 455 (e.g., 5G radio). As described herein, the information handling system 400 may also include one or more of these types of antenna systems 450, 455 as well as other types of antenna systems such as an LTE antenna system or Bluetooth antenna system. The principles described in connection with the Wi-Fi antenna system 450 and 5G NR antenna system 455, therefore, apply equally to the use of an LTE antenna system and Bluetooth antenna system.

During operation, the information handling system 400 may engage in certain streaming operations using a streaming application 420, downloading operations using a downloading application 410, and browsing operations using a browsing application 405. The data to be transmitted during these operations may be directed to either the Wi-Fi antenna system 450 or 5G NR antenna system 455 by the browsing application 405, downloading application 410, and streaming application 420 as the data is created.

In an embodiment, a prioritization module of an application data prioritization and network slicing module for the information handling system 400 may interface with, for example, a virtual Wi-Fi driver 445 that manages a plurality of virtual adapters 430, 435, 440. Each virtual adapter 430, 435, 440 may be dedicated to a particular data such as the streaming data from a streaming application 420 such that the virtual adapters are used to mimic network slicing at a Wi-Fi-enabled AP 415. As illustrated in FIG. 4 the data from the streaming application 420, the downloading application 410, and browsing application 405 may be received at a third virtual adapter 440, a second virtual adapter 435, and a first virtual adapter 430, respectively. This data may be transmitted on a virtual "slice" such as a browsing virtual slice 472, a downloading virtual slice 474, and a streaming virtual slice 476. The Wi-Fi enabled AP 415 would have been selected by aggregated score for metrics of data and wireless signal factors monitored for a connection with the information handling system 400. During operation of the virtual Wi-Fi driver 445 with the virtual adapters 430, 435, 440, the virtual Wi-Fi driver 445 may sequentially transmit data over the browsing virtual slice 472, downloading virtual slice 474, and streaming virtual slice 476 to a first BSSID 460, a second BSSID 465, and a third BSSID 470 of the Wi-Fi-enabled AP 415, respectively. This enables the isolation of different types of traffic at the Wi-Fi-enabled AP 415.

During operation, the information handling system 400 may concurrently or sequentially transmit data via a 5G NR antenna system 455. Similarly, the data created through the execution of the streaming application 420, downloading application 410, and browsing application 405 may be sent to the 5G NR antenna system 455 for transmission to a 5G NR-enabled AP 425. In an embodiment, the information handling system 400 may include a network slicing module of the application data prioritization and network slicing module. The network slicing module may form network slices based on a plurality of application categories defining the applications used to transmit data from the information handling system 400 to the 5G NR-enabled AP 425. When communicatively coupled to a 5G network, the information handling system 400 may request that the three (or more) categories of applications (e.g., streaming application 420, downloading application 410, browsing application 405) are each assigned a network slice by the processors of the 5G NR-enabled AP 425 such that the behaviors and functionalities required for each of these categories of slices may be met. The 5G NR-enabled AP 425 would have been selected by aggregated score for metrics of data and wireless signal factors monitored for a connection with the information handling system 400. For example, a streaming network slice 482, a downloading network slice 480, and a browsing network slice 478 may each be allocated those resources that would result in the data being transmitted across the 5G wireless network in the most efficient manner. In this example, the streaming network slice 482, for example, may be given prioritized traffic resources above those for other categories of slices 480, 478. Because this network slicing feature is native to the operation of the 5G NR antenna system 455, the categorization of the applications prior to transmission may allow for higher data throughput for those applications that have high data traffic requirements.

Thus, according to embodiments such as the example of FIG. 4, if the 5G NR-enabled AP 425 is highly scored for low latency and high bandwidth and such aspects meet the application data categorization for a streaming data category, the embodiments herein may prioritize the streaming network slice 482 for the 5G NR-enabled AP 425 for some or all streaming categorized application data in an embodiment. Further, one or more other categories with lower priority, such as either or both of browsing application data or downloading application data, may be diverted to browsing network slice 472 or downloading network slice 474 of another wireless protocol AP such as the Wi-Fi enable AP 415. In this way, the embodiments herein may free up the 5G NR-enabled AP 425 from congestion and airwave occupancy for data throughput for the streaming network slice 482 with the 5G NR-enabled AP 425 providing an optimal aggregated score level for the streaming category of application data needs.

Figure 5:
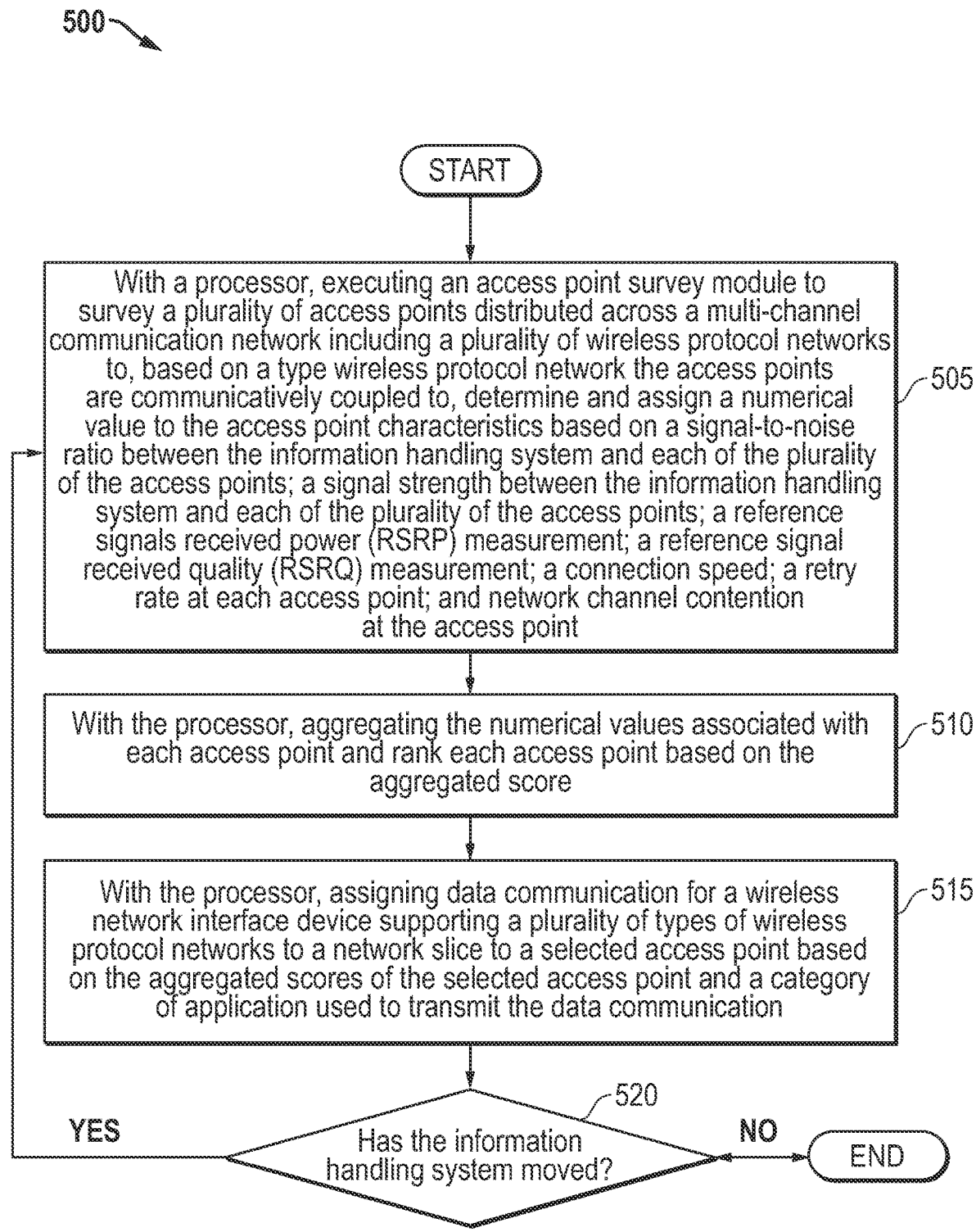
FIG. 5 is a flow diagram illustrating a method of prioritizing network traffic over a multi-channel communication network according to an embodiment of the present disclosure.

FIG. 5 is a flow diagram illustrating a method 500 of prioritizing network traffic over a multi-channel communication network according to an embodiment of the present disclosure. The method 500 may include at block 505, executing an access point survey module with a processor to survey a plurality of access points distributed across a multi-channel communication network including a plurality of wireless protocol networks to, based on a type wireless protocol network the access points are communicatively coupled to, determine and assign a numerical value to the access point characteristics. In an embodiment, the access point characteristics may be based on a signal-to-noise ratio between the information handling system and each of the plurality of the access points; a signal strength between the information handling system and each of the plurality of the access points; a reference signals received power (RSRP) measurement; a reference signal received quality (RSRQ) measurement; a connection speed; a retry rate at each access point; and network channel contention at the access point. During operation, the information handling system may score each AP based on the specific type of AP being surveyed. In an embodiment, for an LTE-enabled AP, the access point survey module described herein may determine the RSRP measurement, the RSRQ measurement, and the SNR. In an embodiment, for a 5G NR-enabled AP, the access point survey module may determine any one of the SNR between the information handling system and the AP, signal strength between the information handling system and the AP, RSRP measurement, RSRQ measurement, a connection speed, a retry rate the AP, and network channel contention at the AP. In an embodiment, for a Wi-Fi-enabled AP, the access point survey module may determine the signal strength of the signal between the information handling system 100 and the Wi-Fi-enabled AP, the SNR, a channel contention at the Wi-Fi-enabled AP descriptive of the available bandwidth across the Wi-Fi-enabled AP, a retry rate of the Wi-Fi-enabled AP, and a connection speed at the Wi-Fi-enabled AP. In an embodiment, the access point survey module described herein may assign a numerical value to those characteristics based, for example, on criteria linking measured levels of various signal and data delivery factors with ratings or weighted ratings in tables accessible by the scoring and ranking module of embodiments herein. For example, tables 1 and 2 show one set of example data for purposes of illustration, but any levels and ratings may be used with any wireless protocols for any of the variety of signal and data delivery factors measured for wireless protocols described herein and is contemplated as such in embodiments of the present disclosure.

The information handling system may then execute the scoring and ranking module to aggregate the numerical values associated with each APs and rank each AP based on an aggregated score. The aggregated score is collected from the determined numerical values of the reported signal measurement and measured data delivery factors as describe for each APs wireless protocol. The score value from scoring tables for each wireless protocol maybe added for the AP and normalized. Normalization may occur according to the number of signal and data delivery factors measured or reported and the possible scoring for those factors. For example, in table 1, six factors are shown with possible scoring points of 3 per factor. Thus, for the Wi-Fi enabled APs of the example of table 1, the aggregated score for a particular Wi-Fi enabled AP may add all the numerical value scores for each signal or data delivery factor and divide by a factor of 15 (5 factors with possible score of 3 per each) in an example embodiment. For the LTE-enabled access point example of table 2, the aggregated score for a particular LTE-enabled AP may add all the numerical value scores for each signal or data delivery factor and divide by a factor of 9 (3 factors with possible score of 3 per each) in an example embodiment. In this way, the aggregated score for the Wi-Fi enabled AP may be ranked against the aggregated score of an LTE-enabled AP in the example embodiment of tables 1 and 2. It is appreciated that this also permits the scoring and ranking module to aggregate and rank scores across different AP from differing protocols, but also to utilize any number of signal and data delivery factors for a wireless protocol in various embodiments. In some embodiments, this number of signal and data delivery factors may be dependent on what is available or reported for particular wireless protocol APs and the scoring and ranking module may adjust depending on what is available. In other embodiments, the scoring and ranking module may utilize determined signal and data delivery factors that are important for ranking the access point. Further, one or more signal and data deliver factors may be weighted differently by providing a different scoring scale or multipliers for numerical values associated with one or more particular signal or data delivery factors in embodiments herein. For example, such weighting may reflect considerations for importance of latency or bandwidth factors to be applied related to data application categorizations and data needs from certain categories of data when ranking the wireless protocol APs.

In yet another embodiment, a security module may work with the scoring and ranking module to eliminate or enable access to some wireless protocol networks via the surveyed APs based on a variety of security considerations of data streams where applicable. For example, criteria, such as the example criteria shown in Table 3, may be utilized to eliminate or affect the ranking of access points in the multichannel network having several wireless protocol networks. Such security ranking concerns may be applied depending on the endpoint information handling system, a set of rules set forth by an IT manager (such as for an enterprise) for endpoint devices or network accesses, or the nature of the given application data traffic.

The method 500 may include, at block 510, aggregating, with the processor, the numerical values associated with each access point and rank each access point based on an aggregated score. In embodiments, the aggregate score may include normalized and weighted characteristics that may affect the aggregate score calculated and which may be tailored to data need considerations, such as latency or bandwidth considerations, for various categories of application data for use with network slices across multiple channels of several wireless protocols. As described herein, an aggregated score may be created for each AP that the information handling system may be communicatively coupled to.

The method 500 may further include assigning, at block 515, data communication for a wireless network interface device supporting a plurality of types of wireless protocol networks to a network slice to a selected access point based on the aggregated scores of the selected access point and a category of application used to transmit the data communication with the processor. As described herein, the category type of data to be transmitted, the security level of the communication network, and the resources available on the network may be taken into consideration when assigning the data communication for a wireless network interface device. Upon determination of the network slices for the ranked APs available for wireless communication with the multichannel network by the endpoint information handling system, the network slices across the plurality of wireless protocols may be selected for categories of application data to be transmitted. For example, if a 5G NR access point report very high bandwidth and low latency and a streaming category requires such features and has high priority, a streaming slice may be prioritized for use with application data in the streaming category with the 5G NR access point. Other data types may be directed to the downloading slice or browsing slice on a different wireless network in the multichannel network to free up congestion and access to the 5G NR AP for the streaming slice. Similarly, multiple endpoint devices with access to the 5G NR AP may have lower priority category application data diverted to other wireless protocols. In another embodiment, the streaming slice may use both a 5G NR AP streaming slice as well as another protocol streaming slice (e.g., a Wi-Fi streaming slice 476 of FIG. 4) to increase bandwidth or latency where appropriate. Lower priority slices, such as browsing and downloading streaming slices, may be limited to the other protocol AP. In yet other embodiments, categorized application data can be prioritized to the plurality of wireless protocol access points in any combination to improve availability of one or more APs for particular category types of data when relevant to ongoing endpoint information handling system data transmission and reception. In this way, the application data prioritization and network slicing module and other modules described herein may manage one or more endpoint information handling system's utilization of a multichannel network having a plurality of wireless protocol networks available and a plurality of APs to choose from.

The method 500 may include a process of determining, at block 520, whether the information handling system has been physically moved. As described herein, the information handling system may include locations sensors such as a gyroscope, a global positioning satellite (GPS) system, and an accelerometer, among other types of location sensors that are capable of determining whether the information handling system has been moved since last being communicatively coupled to an AP. When it is determined that the information handling system has moved (YES determination at block 520), the process may continue back at block 505 with executing the access point survey module to survey a plurality of access points distributed across a multi-channel communication network including a plurality of wireless protocol networks. When it is determined that the information handling system has not moved (NO determination at block 520), the method may end.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
a processor executing applications generating a plurality of data types for communication;
a memory;
a wireless network interface device for communication with a plurality of multi-channel communication networks for a plurality of wireless protocol networks, where the plurality of multi-channel communication networks includes at least an Institute for Electrical and Electronics Engineers (IEEE) 802.11 WLAN standard wireless protocol network and a non-IEEE 802.11 WLAN stand and wireless protocol network and each multi-channel communication network provides for a plurality of a parallel network slices to a protocol-specific access point across the plurality of wireless protocol networks;
the processor executing code instructions of a wireless virtualization module to create a plurality of virtual adapters to isolate different types of data traffic from the information handling system to the wireless access points to be associated with a plurality of identifiers at the access point to create the plurality of network slices for wireless data communications;
the processor executing code instructions of an access point survey module to, upon execution of the processor, survey a plurality of access points distributed across the plurality of multi-channel communication networks to determine and assign a numerical value to the access point wireless link quality characteristics by wireless protocol network for each of the plurality of multi-channel communication networks;
the processor executing code instructions of a scoring and ranking module to aggregate the numerical values associated with each access point link quality characteristics and rank each access point based on an aggregated score based on the determined numerical values; and the processor to assign communication for a network slice from the wireless network interface to an access point channel in one of the plurality of multi-channel communication networks based on the aggregated scores of the access point.

2. The information handling system of claim 1, further comprising:

the processor executing code instructions of a recalculation policy module to define an interval time to resurvey the plurality of access points distributed across the plurality of multi-channel communication networks and recalculate the score.

3. The information handling system of claim 1, further comprising:

an information handling system location module to:

detect a change in location of the information handling system;

determine that the change is location exceeds a threshold distance; and the processor executing code instructions of a recalculation policy module to resurvey the plurality of access points distributed across the plurality of multi-channel communication networks and recalculate the score.

4. The information handling system of claim 1, further comprising:

the processor executing code instructions of a prioritization module to prioritize a first data stream from a first category of application sent from the information handling system to a first access point into a first network slice for communication to the first access point.

5. The information handling system of claim 4, further comprising:

the processor executing code instructions of the prioritization module to prioritize a second data stream from a second category of application sent from the information handling system to a second access point into a second network slice for communication to the second access point.

6. The information handling system of claim 1, further comprising:

the processor executing code instructions of an application prioritization module to inventory applications used to transmit data from the information handling system to the access points and prioritize transmissions of data into plural network slices based on a category of application used to transmit the data.

7. The information handling system of claim 6, wherein the category of applications used to transmit data is selected from a streaming application category, a browsing application category, and a data download application category.

8. The information handling system of claim 1, further comprising:

the processor executing code instructions of a network slicing module to form the network slices based on a plurality of application categories of applications used to transmit data from the information handling system to the access points, where the categories of applications used to transmit data are selected from a streaming application category, a browsing application category, and a data download application category; and the processor executing code instructions of a slice prioritization module to prioritize data traffic over the network slices among the plurality of multi-channel communication networks based on the category of application used to transmit that data.

9. The information handling system of claim 1, wherein the wireless network interface device includes a Wi-Fi antenna system and a 5G new radio (NR) antenna to communicate with Wi-Fi-enabled access point and 5G NR-access point in the multi-channel network.

10. A method of prioritizing network traffic over a multi-channel communication network, comprising:

with a processor, executing code instructions of a wireless virtualization module to create a plurality of virtual adapters at a wireless network interface device to isolate different types of data traffic from the information handling system to the wireless access points to be associated with a plurality of identifiers at the access point to create the plurality of network slices for wireless data communications across a plurality of multi-channel communication networks, where the plurality of multi-channel communication networks includes at least an Institute for Electrical and Electronics Engineers (IEEE) 802.11 WLAN standard wireless protocol network and a non-IEEE 802.11 WLAN standard wireless protocol network and each multi-channel communication network provides for a plurality parallel network slices to a protocol-specific access point across each of the plurality of multi-channel communication networks;

executing code instructions of an access point survey module to survey a plurality of access points of a plurality of wireless protocol networks forming the plurality of multi-channel communication networks to determine and assign a numerical value to the access point wireless link quality characteristics by wireless protocol network of each of the multi-channel communication networks;

aggregating the numerical values associated with each access point and rank each access point based on an aggregated score; and assigning data communication for the wireless network interface device supporting a plurality of types of wireless protocol networks to a network slice to a selected access point among the plurality of multi-channel communication networks based on the aggregated scores of the selected access point and a category of application used to transmit the data communication.

11. The method of claim 10, further comprising:

defining an interval time to resurvey the plurality of access points distributed across the plurality of multi-channel communication networks and recalculate the score.

12. The method of claim 10, further comprising:

detecting a change in location of the information handling system;

determining that the change is location exceeds a threshold distance; and resurveying the plurality of access points distributed across the plurality of multi-channel communication networks and recalculate the score.

13. The method of claim 10, wherein the wireless network interface device sends data streams sent from the information handling system to a plurality of selected access points on network slices via a Wi-Fi antenna system and a 5G new radio (NR) antenna to communicate with at least one Wi-Fi-enabled access point and at least one 5G NR-access point in the multi-channel communication network.

14. The method of claim 10, further comprising:
inventorying applications executing on the information handling system and used to transmit data from the information handling system to the access points; and
prioritizing transmissions of data based on the category of application used to transmit the data categorized based on latency needs and bandwidth data transmission needs of the application executing on the information handling system.

15. The method of claim 10, further comprising:
forming network slices and assigning network slices to the category of application among a plurality of application categories for applications used to transmit data from the information handling system to the access points, wherein the categories are selected from a streaming application category, a browsing application category, and a data download application category; and
prioritizing data traffic over the network slices among the plurality of multi-channel communication networks assigned based on the application category for the applications used to transmit that data.

16. The method of claim 10, further comprising:
executing a 5G new radio (NR) virtualization module to create a plurality of virtualized network slices to isolate different types of data traffic on network slices for 5G data communications from the information handling system to a 5G NR access point within the multi-channel communication network.

17. An information handling system, comprising:
a processor executing applications generating a plurality of data types for communication;
a memory;
a wireless network interface device for communication with a plurality of multi-channel communication networks for a plurality of wireless protocol networks, where the plurality of multi-channel communication networks includes at least an Institute for Electrical and Electronics Engineers (IEEE) 802.11 WLAN standard wireless protocol network and a non-IEEE 802.11 WLAN standard wireless network and each multi-channel communication network provides for a plurality of parallel network slices to a protocol-specific access point across the plurality of wireless protocol networks;
the processor executing code instructions of a wireless virtualization module to create a plurality of virtual adapters for the wireless network interface device to isolate different types of data traffic from the information handling system to a Wi-Fi access point to be associated with a plurality of basic service set identifiers (BSSIDs) at the Wi-Fi access point to create network slices for Wi-Fi data communications and to create a plurality of virtualized network slices to isolate different types of data traffic on network slices for 5G data communications from the information handling system to a 5G NR access point;
the processor executing code instructions of an access point survey module to, upon execution of the processor, survey a plurality of access points distributed across the plurality of multi-channel communication networks to determine and assign a numerical value to the access point wireless link quality characteristics by wireless protocol network;
the processor executing code instructions of a scoring and ranking module to aggregate the numerical values associated with each access point link quality characteristics and rank each access point across the plurality of multi-channel communication networks based on an aggregated score based on the determined numerical values; and
the processor to assign communication for a network slice from the wireless network interface to an access point channel based on the aggregated scores of the access point.

18. The information handling system of claim 17, further comprising:
the processor executing code instructions of a recalculation policy module to define an interval time to resurvey the plurality of access points distributed across the plurality of multi-channel communication networks and recalculate the aggregated score.

19. The information handling system of claim 17, further comprising:
an information handling system location module to detect a change in location of the information handling system exceeds a threshold distance; and
a recalculation policy module to resurvey the plurality of access points distributed across the plurality of multi-channel communication networks and recalculate the aggregated score.

20. The information handling system of claim 17, further comprising:
the processor executing code instructions of an application prioritization module to inventory applications used to transmit data from the information handling system to the access points and prioritize transmissions of data into plural network slices based on a category of application used to transmit the data.

* * * * *